UNITED STATES PATENT OFFICE

IRVING S. BARKSDALE, OF GREENVILLE, SOUTH CAROLINA

BACTERIACIDE AND A PROCESS FOR MAKING SAME

No Drawing. Application filed November 19, 1929. Serial No. 408,422.

This invention relates to a bacteriacide and a process for making the same.

It is well known that certain dyes, particularly those of the aniline coloring matters, possess marked germicidal effects upon the pathogenic or disease producing bacteria so that it is possible not only to destroy the bacteria, but to determine the kind of bacteria by the effect of the dye on the bacteria.

An object of the present invention is the provision of a bacteriacide of the triphenylmethane series combined with one of the heavy metals of a lead group.

Another object of the invention is the provision of a process for producing a bacteriacide formed from one of the heavy metals and a derivative of para-rosaniline.

This invention will be best understood from a consideration of the following detailed description; nevertheless, it is to be understood that the invention is susceptible of such changes and modifications as shall define no material departure from the salient features of the invention as expressed in the appended claims.

In carrying out my invention, I dissolve a para-rosaniline derivative or a homologue of the triphenylmethane series in distilled water and titrate a weak solution of the above with a solution of one of the heavy metals of the lead group and ammonium citrate. The product yielded by this process of titration is a purple aniline dye combined with a heavy metal and which possesses certain marked germicidal effects upon the pathogenic or disease producing bacteria. The dye thus formed which is combined with one of the heavy metals may be also employed by its action on the particular bacteria to determine the kind of bacteria under observation.

The following particular example is cited disclosing the process in the manufacture of the aniline dyes.

Crystal violet is one of the dyes selected for the purpose and belongs to the triphenylmethane series and is more particularly formed from the leuco base, dimethyl aniline or hexamethyl-para-rosaniline which is a para-rosaniline derivative.

The structural formula of the crystal violet is as follows:

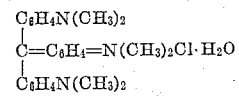

One-hundredth of a gram (10 milligrams) of bismuth and ammonium citrates are dissolved in one (1) cubic centimeter of distilled water. This solution is more particularly described as "Liquor bismuthi et ammonii citrates" on page 1224 U. S. Dispensatory, 21st edition. One grams of crystal violet (hexamethyl-pararosaniline) is dissolved in 100 cubic centimeters of distilled water.

A soluble form of bismuth is bismuth citrate in the presence of ammonium citrate and all reference in the specification to bismuth and ammonium citrates should be considered as bismuth citrate rendered water soluble in ammonium citrate.

Five-tenths to seven-tenths of a cubic centimeter of the solution of bismuth citrate and ammonium citrate solution are titrated with 100 cubic centimeters of a 1 per cent solution of crystal violet (hexamethyl-pararosaniline), so as to give a proportion of five-one thousandths to seven-one thousandths parts of bismuth and ammonium citrate to one part of crystal violet (hexamethyl-pararosaniline) by weight in the finished solution. In 10 mgm. of a solution of bismuth citrate and ammonium citrate approximately one-half of this composition consists of metallic bismuth.

While I have disclosed particularly the use of bismuth in the example noted above, it will be appreciated that any of the aniline dyes or compounds of aniline may be treated with any of the heavy metals of the lead group or their salts for the purpose of producing a new germicidal drug for obtaining certain effects upon the pathogenic or disease producing bacteria, and such effects may be either for the purpose of destroying the bacteria or for determining the type of bacteria under observation.

I claim:—

1. A process of producing a bacteriacide which comprises titrating a weak solution of hexamethyl-para-rosaniline with a solution of bismuth and ammonium citrates.

2. A process of producing a bacteriacide which comprises dissolving 1 gram of hexamethyl-para-rosaniline in 100 cubic centimeters of distilled water, then dissolving 10 milligrammes of bismuth and ammonium citrates in 1 cubic centimeter of distilled water, then titrating approximately six tenths of a cubic centimeter of the solution of the bismuth and ammonium citrates with the 100 cubic centimeters of the hexamethyl-para-rosaniline.

3. A compound of hexamethyl-para-rosaniline and bismuth.

4. A process for producing a bacteriacide which comprises titrating a weak solution of hexamethyl-para-rosaniline with a solution of bismuth citrate.

5. A process for producing a bacteriacide which comprises reacting a solution of hexamethyl-para-rosaniline with a solution of bismuth citrate rendered water soluble in a solution of ammonium citrate.

6. A compound of a triphenylmethane dye and bismuth.

Signed at Greenville, in the county of Greenville and State of South Carolina this 19th day of April, A. D. 1929.

IRVING S. BARKSDALE.